United States Patent
Grzina et al.

(10) Patent No.: US 9,144,845 B1
(45) Date of Patent: Sep. 29, 2015

(54) CUTTING TOOLS WITH TEXTURED SURFACES

(75) Inventors: Donald J. Grzina, O'Fallon, MO (US); Rajesh Talwar, Frontenac, MO (US); Jian Cao, Wilmette, IL (US); Qian Wang, Mt. Prospect, IL (US); Zhiyong Cedric Xia, Canton, MI (US); Tiffany Davis Ling, Minneapolis, MN (US); Pinzhi Liu, Evanston, IL (US)

(73) Assignee: The Boeing Company, Chicago, IL (US)

( * ) Notice: Subject to any disclaimer, the term of this patent is extended or adjusted under 35 U.S.C. 154(b) by 801 days.

(21) Appl. No.: 13/409,211

(22) Filed: Mar. 1, 2012

(51) Int. Cl.
*B23B 27/00* (2006.01)
*B23C 5/10* (2006.01)

(52) U.S. Cl.
CPC ...................................... *B23B 27/00* (2013.01)

(58) Field of Classification Search
CPC ................ B23B 27/143; B23B 27/145; B23B 2200/085; B23B 2200/321; B23C 5/10; B23K 26/00
USPC ............ 407/53, 54, 61, 42, 113, 114; 82/1.11
See application file for complete search history.

(56) References Cited

U.S. PATENT DOCUMENTS

| | | | | |
|---|---|---|---|---|
| 3,672,017 A * | 6/1972 | Nielsen et al. | ................... | 407/49 |
| 3,715,788 A * | 2/1973 | Ayer | ............................... | 407/37 |
| 4,161,972 A * | 7/1979 | Hanaya | ......................... | 144/176 |
| 4,984,488 A * | 1/1991 | Lunde et al. | ..................... | 76/115 |
| 5,160,232 A * | 11/1992 | Maier | ............................ | 408/223 |
| 5,504,981 A * | 4/1996 | Jensen et al. | ................ | 407/29.13 |
| 5,810,520 A * | 9/1998 | Hintze et al. | .................... | 407/114 |
| 5,913,644 A * | 6/1999 | DeRoche et al. | ................ | 407/42 |
| 5,984,005 A * | 11/1999 | Hart et al. | .................... | 166/55.6 |
| 6,524,036 B1 * | 2/2003 | Kolker | ........................... | 409/131 |
| 6,745,609 B2 * | 6/2004 | Garnett et al. | .................. | 72/350 |
| 7,682,111 B2 * | 3/2010 | Omi | ................ | 408/224 |
| 2010/0003089 A1 * | 1/2010 | Horiike et al. | .................. | 407/40 |

FOREIGN PATENT DOCUMENTS

CN      102189287 A      9/2011

OTHER PUBLICATIONS

Enomoto et al., "Improving anti-adhesive properties of cutting tool surfaces by nano-/micro-textures," CIRP Annals—Manufacturing Technology, 59 (2010), pp. 597-600.

(Continued)

*Primary Examiner* — Will Fridie, Jr.
(74) *Attorney, Agent, or Firm* — Ostrager Chong Flaherty & Broitman P.C.

(57) ABSTRACT

A cutting tool comprising first and second surfaces that intersect at an edge, wherein the first surface (e.g., a rake face, a flank surface or a margin) has a textured region comprising a multiplicity of recesses each having a length greater than its width. The recesses are distributed in a pattern comprising rows of recesses arranged lengthwise along respective lines with spaces between neighboring recesses. The recesses of one row are offset from the recesses of the next row. Each recess of the one row having one end portion that overlaps with an end portion of one recess in the next row and another end portion that overlaps with an end portion of another recess in the next row. The recesses are generally parallel to the edge.

17 Claims, 8 Drawing Sheets

(56) References Cited

OTHER PUBLICATIONS

Kawasegi et al., "Drilling Aluminum Alloy Using Small-Diameter Drills with Micro/Nanometer-Scale Textures," Trans. Japanese Society of Mechanical Engineers, Part C, 76 (2010), pp. 446-452.

Davis et al., "Experimental Friction Study of Micro-Scale Laser-Textured Surfaces," in: Int'l Workshop on Microfactories, Evanston, IL (2008).

* cited by examiner

CUTTING TOOLS WITH TEXTURED SURFACES

BACKGROUND

The present disclosure relates generally to methods for reducing friction and wear of contacting surfaces in manufacturing processes and machine operation. More particularly, this disclosure relates to methods for reducing friction, wear and workpiece adhesion in machining cutters.

Reducing friction and wear of contacting surfaces has been increasingly important as industries strive to improve the energy efficiency of manufacturing processes and machine operation. This is particularly true for the case of cutting tools; high friction and wear in cutting tools can lead to high cutting forces and frequent cutting tool replacement. Use of lubricants between machining cutter and workpiece, and deposition of low-friction coatings on cutters are conventional approaches to friction and wear reduction.

More recently, the creation of surface textures has attracted wide attention because of the possibility of adhesion reduction and lubrication enhancement. Noticeable tribological improvements are evident when properly designed dimples are machined onto contacting surfaces. Theories explaining the effects of surface texturing attribute the tribological benefits to the lubricant pockets created by the dimples. These pockets help to retain lubricant between the contacting parts and reduce side leakage, thereby decreasing friction. Additionally, the textured recesses serve as receptacles for wear particles, preventing further surface damage via plowing. Several works have been conducted to study surface texturing of cutting tools.

There is a need for improved methods for extending the life of tools employed in cutting of metal or metal alloy workpieces. In particular, there is a need for improved methods for reducing workpiece adhesion to cutting tool surfaces and enhancing lubrication during machining of metallic workpieces.

SUMMARY

This disclosure is directed to surface texturing for extending the life of cutting tools employed in machining of metal or metal alloy workpieces, such as titanium workpieces. This can be accomplished by micro-texturing selected surfaces on the cutting tool, e.g., by laser machining. Properly designed micro-scale surface textures on cutting tools can have a positive impact on workpiece adhesion reduction and lubrication enhancement. Different surfaces of a cutting tool, for example, a rake face, a flank or relief surface or a margin, can be textured in accordance with the teachings herein.

Lubricants are formulated to maintain a lubricious film under high hydrodynamic loads. Getting lubricants to the actual cutting edge can be difficult, as in the bottom of a hole being drilled. Micro-texture recesses may form a reservoir to help deliver lubricant to the point of contact between the cutting edge and the workpiece. If implemented into a manufacturing process, friction and wear improvements resulting from textured surface technology should result in enhanced energy efficiency and an extended product life, ultimately helping save both fuel and raw materials.

In the embodiments disclosed below, engineered micro-textures are applied to strategic surfaces and areas on cutting tools to enhance tool performance. The textures may take many forms, from an array of dimples to rows of channel-type recesses. The dimple or recess feature sizes can vary from several to 500 microns. The shape, dimensions and orientation of the machined recesses can be selected to provide one or more of the following benefits: improved cutter wear, reduced friction, enhanced lubrication, and/or reduced workpiece adhesion.

Such micro-texturing can be accomplished by laser machining (or other texture machining methods) various shapes/patterns. One example is an array of rectangular texture features with a triangular distribution pattern laser machined onto selected surfaces of a cutting tool. [As used herein, the term "rectangular" means shaped like a rectangle and includes such shapes having rounded corners.] The recesses may have other shapes, such as elliptical. In particular cases, two or more rows of channel-type recesses can be formed on the surface to be treated. The recesses in each row may have constant spacing. In addition, the recesses in one row are offset relative to and partially overlap the recesses in the adjacent row or rows. The recesses may be 5 to 200 microns wide, 10 to 500 microns long and 1 to 10 microns deep, with the longer sides of the recesses being transverse to the direction of relative motion between the workpiece and cutter. In cases where micro-scale recesses are formed on a rake face or flank surface in an area adjacent a cutting edge, the patterns were chosen so that all chip flow should pass over the micro-machined recesses that make up the texture.

In view of the foregoing, one aspect of the subject matter disclosed in detail hereinafter is a cutting tool comprising first and second surfaces that intersect at an edge, wherein the first surface has a textured region comprising a multiplicity of recesses each having a length greater than its width. The recesses are distributed in a pattern comprising a first row of recesses arranged lengthwise along a first line with spaces between neighboring recesses of the first row, and a second row of recesses arranged lengthwise along a second line with spaces between neighboring recesses of the second row, the recesses of the second row being offset from the recesses of the first row. Recesses of the first row have end portions that overlap with the end portions of the recesses in the second row. The pattern set by the first and second rows of recess repeats as needed.

Another aspect is a method for treating a cutting tool to improve its durability by laser machining (or other texture machining methods) a multiplicity of recesses on either or both of first and second surfaces that meet at an edge. The recesses are shaped and arrayed as described in the previous paragraph.

A further aspect is a cutting tool comprising a rake face and a flank surface which intersect at a cutting edge, wherein the flank surface has a textured region near the cutting edge, the textured region comprising a multiplicity of machined recesses distributed in a pattern.

Yet another aspect is a cutting tool comprising a margin and a flute which intersect at a helical edge, wherein the margin has a textured region comprising a multiplicity of machined recesses distributed in a pattern. In particular, the margins of drill bits for drilling titanium workpieces can be micro-textured to reduce adhesion of titanium chips to the drill bit margins, in which case the longer sides of the recesses are parallel to the margin edges.

Other aspects are disclosed and claimed below.

BRIEF DESCRIPTION OF THE DRAWINGS

Various embodiments will be hereinafter described with reference to the drawings.

FIG. 2 illustrates the zone immediately adjacent to the cutting edge after some cutting edge wear.

Reference will hereinafter be made to the drawings in which similar elements in different drawings bear the same reference numerals.

DETAILED DESCRIPTION

Figure 1:
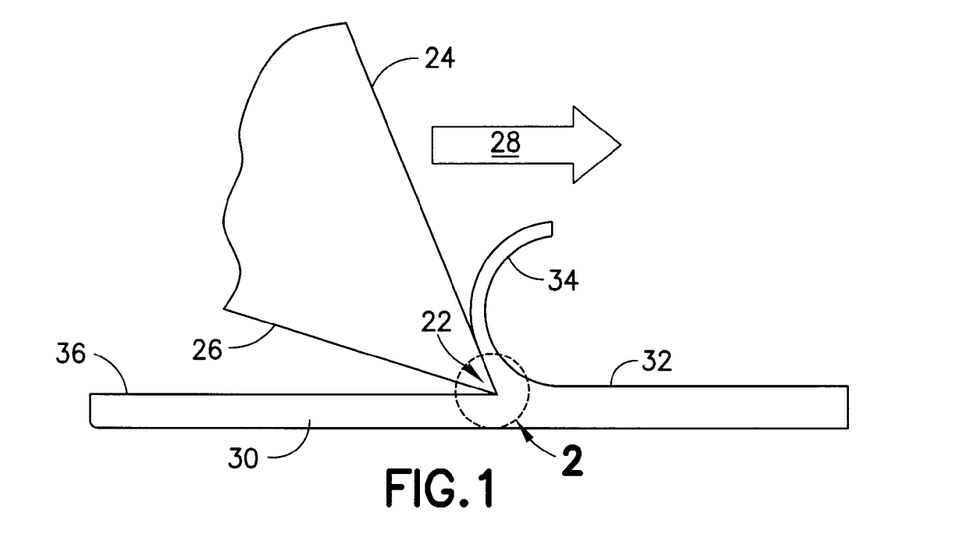
FIG. 1 is a diagram showing a cross section of a cutting edge of a simplified cutter.

Nearly all cutting tools share the concepts shown in the simplified cutter sketch of FIG. 1, which shows a cutting edge portion of a cutting tool in cross section. The cutting edge 22 is generally formed at the intersection of two surfaces: a rake face 24 and a flank surface 26. These two surfaces need not be planar and make take on compound curves. Cutting tools perform their intended function by relative motion, represented by the arrow 28, of the cutting tool with respect to the workpiece 30, which for the purpose of FIG. 1 should be visualized as fixed in space. Cutting tools generally achieve motion relative to the workpiece through some type of machine tool, for example, a milling machine, a lathe, or a drill press, with sufficient power to overcome all resistance. The cutting edge 22 enters the workpiece 30 at a level below the pre-machined surface 32. The rake face 24 pushes the workpiece material ahead of it in the direction of relative motion. The workpiece material is compressed and strained until shear stress causes a fracture of the material ahead of the cutting edge 22. The area of workpiece material compression is a zone of extremely high contact forces on the rake face 24 of the cutting tool. The fractured material forms a chip 34 which typically slides along the surface of the rake face 24. The zone of contact between the chip 34 and the rake face 24 is another area of high contact forces, friction and heat. The surface remaining behind the cutting edge 22 is the machined surface 36. The net effect is a portion of material is removed from the workpiece 30 in the form of a chip 34, leaving a freshly machined surface 36. This operation continues until the workpiece 30 has the desired shape or form.

Figure 2:
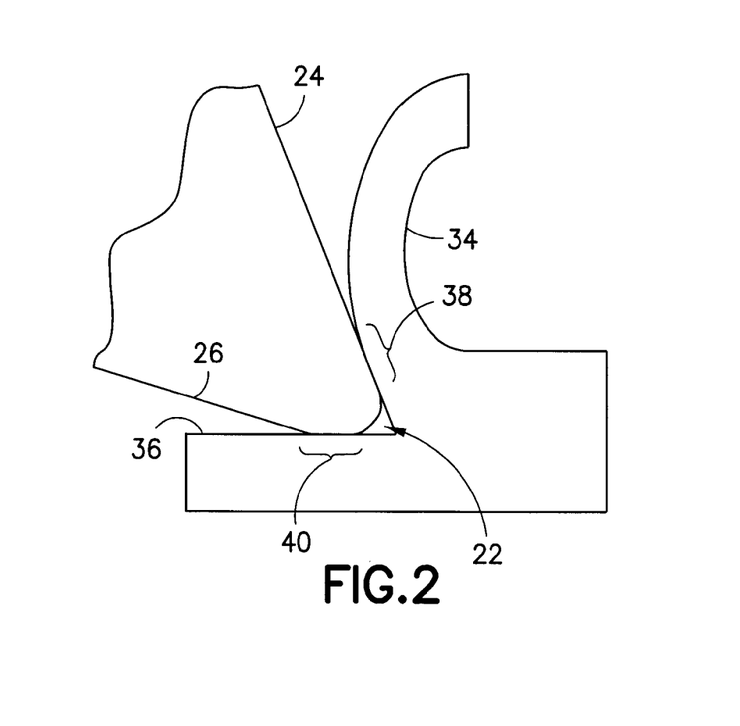
FIG. 2 is a diagram showing a magnified portion of the cutting edge depicted in FIG. 1, which portion is indicated by the dashed circle in FIG. 1.

Referring now to FIG. 2, the zone immediately adjacent to the cutting edge 22 is illustrated (on a magnified scale) for the case wherein some cutting edge wear has occurred. On a microscopic scale, the cutting edge seldom starts out dead-sharp due to cutting tool material properties and processing limitations. In practice, cutting tools wear and the cutting edge 22 becomes rounded and dull through abrasion and micro-chipping along the cutting edge. The rake face 24 may experience abrasive wear in the zone 38 due to the high forces and sliding contact with the chip 34. The flank surface 26 wears in zone 40 due to sliding contact with the machined surface 36.

Figure 3:
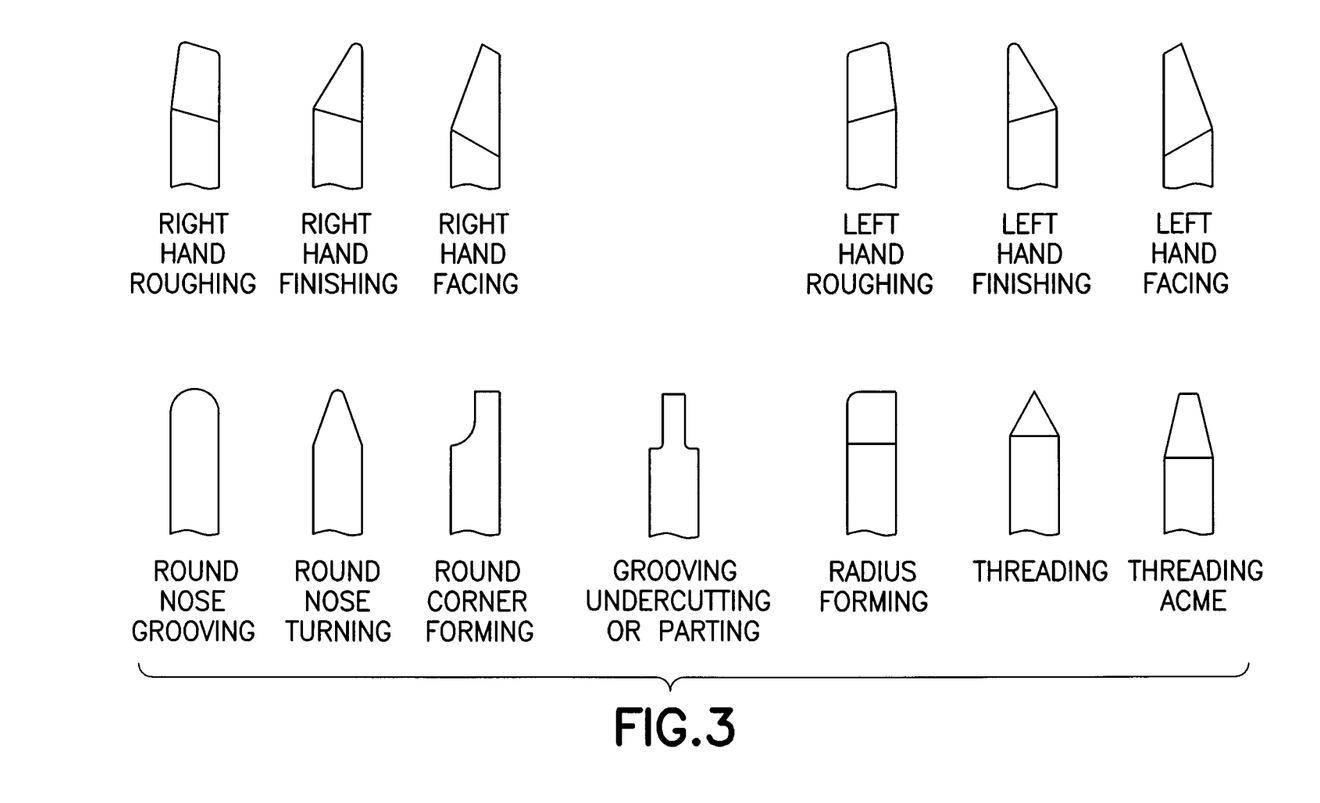
FIG. 3 is a diagram showing a collection of known lathe cutting tools (i.e., non-rotating cutters) having a single cutting edge.

The simple model of a cutting edge depicted in FIGS. 1 and 2 relates to various practical cutting tools. Machine tools such as lathes and shapers use "single point" cutting tools that look very much like the simple model discussed above. FIG. 3 is an illustration of a collection of lathe "single point" cutting tools. The term "single point" does not necessarily denote that the cutting edge is a point, but rather only that there is a single cutting edge.

Figure 4:
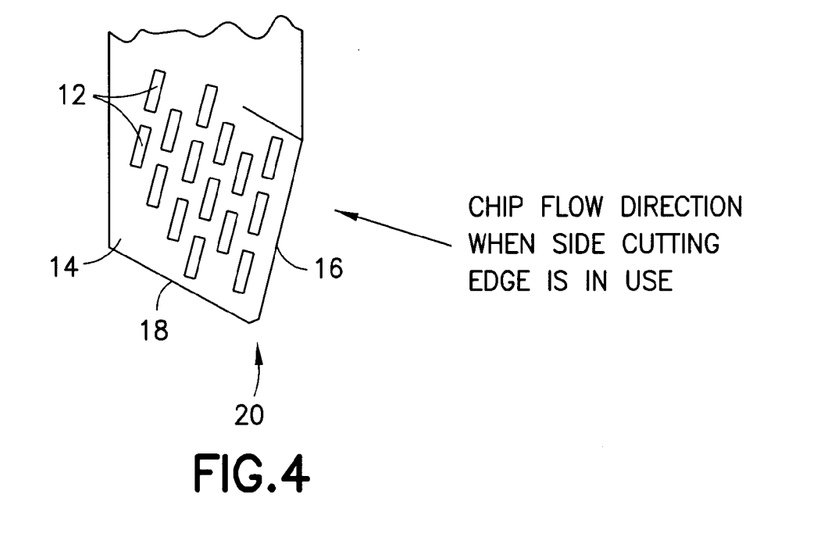
FIG. 4 is a diagram showing a micro-textured rake face of a lathe cutting tool in accordance with one embodiment.

FIG. 4 shows a micro-textured rake face 14 of a lathe cutting tool (i.e., a lathe bit) in accordance with one embodiment. This lathe bit has a side cutting edge 16 and an end cutting edge 18 which extend from a nose radius 20. The end cutting edge 18 cuts when the lathe bit is fed toward a spin axis of the workpiece; the side cutting edge 16 cuts when the lathe bit is fed left (or right) in parallel with the spin axis.

To increase durability, a multiplicity of channel-type recesses 12 can be formed on the rake face 14 by laser machining. Each recess 12 has a length greater than its width. The recesses 12 are distributed in a triangular pattern comprising multiple rows of recesses arranged along respective lines with spaces between neighboring recesses of each row. As seen in FIG. 4, the recesses of one row are offset from the recesses of the adjacent rows. Most of the recesses (e.g., recesses not located at the end of a row) have respective end portions that overlap with the end portions of respective recesses in each of the adjacent rows. The recess pattern was chosen so that all chip flow during side cutting should pass over the micro-machined recesses that make up the texture. In one embodiment, the rows of recesses may be mutually parallel; however, precise parallelism is not required for the achievement of the benefits described herein.

In accordance with various embodiments, the lengths of the recesses 12 may be in a range of 10 to 500 microns and the widths may be in a range of 5 to 200 microns. As shown in FIG. 4, the longer side of each recess is oriented transverse to a chip flow direction (indicated by the wide arrow) during side cutting. The overlap between recesses in adjacent rows is less than one-quarter of the length of the recesses. The depth of the recesses may be in a range of 1 to 10 microns.

Alternatively or additionally, the flank surface (not shown in FIG. 4) of the lathe bit can also be textured with a pattern of recesses similar to that depicted in FIG. 4.

The intersection of two flat plane surfaces yields a straight line. The intersection of a flat plane and a cylinder yields a circle or an ellipse. Through manipulation of the two intersecting surfaces, the cutting tool designer can generate an infinite variety of curved cutting edges.

Figure 5:
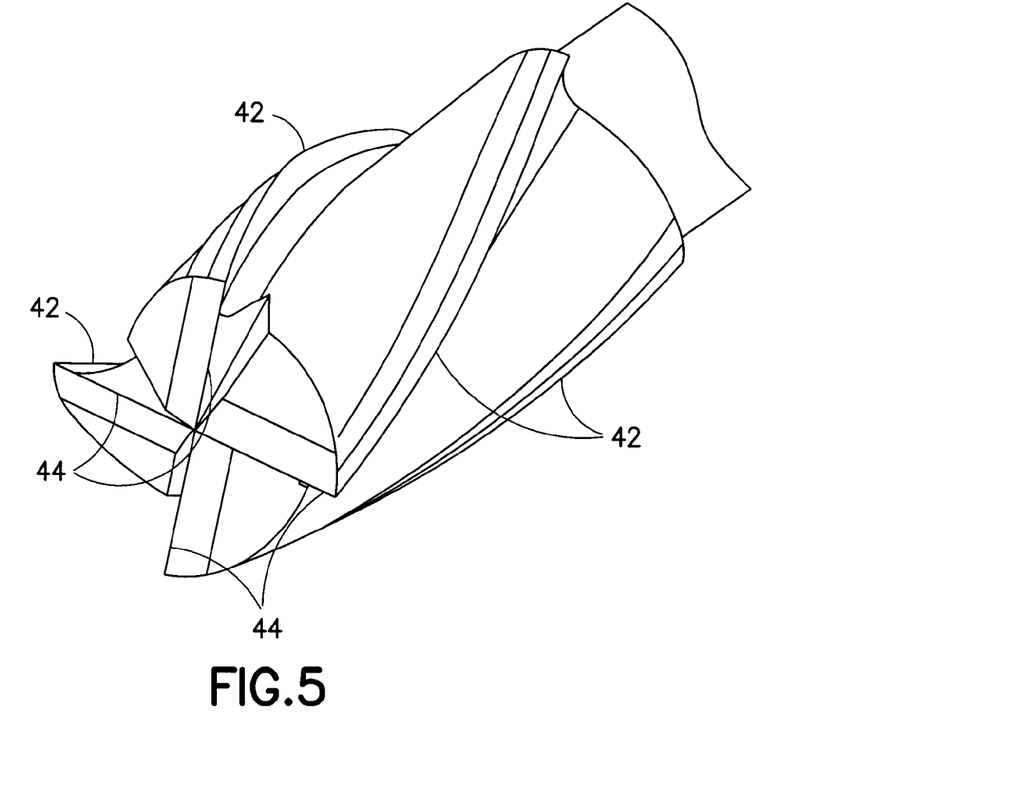
FIGS. 5 and 6 are diagrams showing an isometric view of one end of a typical end milling cutter with helical cutting edges.
Figures 6, 7, 8:
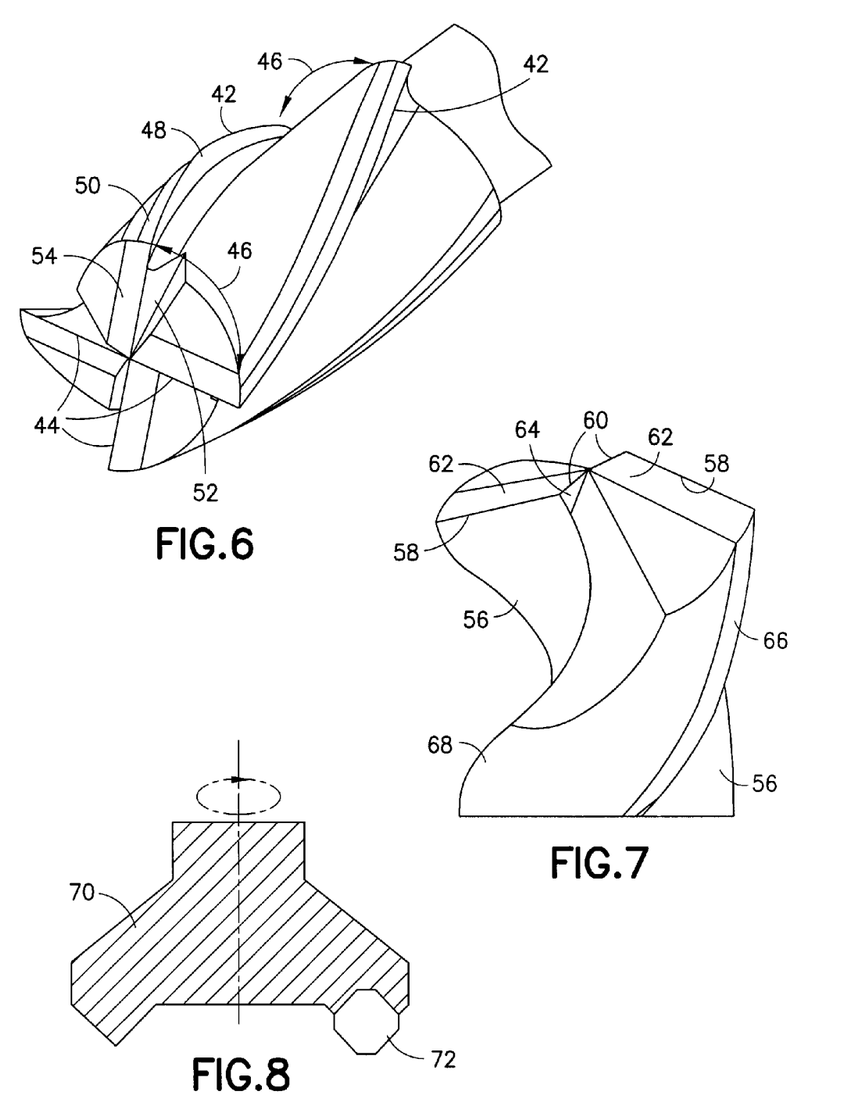
FIG. 7 is a diagram showing an isometric view of one end of a typical twist drill bit with helical flutes.
FIG. 8 is a diagram showing a sectional view of a known cutting tool having replaceable cutting edges in the form of an insert.

In many circumstances the cutting edge is designed to be a helix wrapped about the cutter's longitudinal axis. Single-edge router bits are one example, but most such "rotary" cutting tools have multiple helical cutting edges. This class of cutting tool is rotated by the machine tool about the helical axis, and cuts material off the side of the cutter. End milling cutters are an example of side cutting rotary cutting tools with helical cutting edges. A portion of an exemplary end milling cutter is shown in FIGS. 5 and 6. In this example the cutter has four helical cutting edges 42 designed to side-cut as the cutter is fed in a direction orthogonal to the cutter axis. This example is typical in that it also has end-cutting cutting edges 44 designed to cut when fed in a direction coincident with the cutter axis. This example has a sharp corner at the intersection of the side and end cutting edges, but many have a radius here, up to the full radius of the cutter to form a "ball-nose" endmill.

Referring now to FIG. 6, the channels of the end milling cutter formed between the helical cutting edges 42 are called flutes 46, whose function is to provide a space for the chips to occupy until they are rejected out of the flute into open space. The rake face 48 forms at least a portion of the flute. The flank surface of this helical cutting tool is called a relief land 50. Similarly, the end-cutting cutting edges 44 are formed at the intersection of their gash 52 and their relief land 54 surfaces.

In accordance with various embodiments, the rake faces 48 and relief lands 50 which meet at the respective helical cutting edges 42 of the end milling cutter shown in FIG. 5 can be textured with a pattern of recesses similar to that depicted in FIG. 4.

Cutting tools designed to generate holes include drills and reamers. Both have end-cutting cutting edges and typically have helical flutes. However, drills and reamers are designed to cut only when fed along the tools longitudinal axis, not laterally as they are not expected to be side-cutting. Therefore drills and reamers do not have helical cutting edges like the end mill. FIG. 7 illustrates the point of a typical twist drill bit. Twist drill bits usually have just two helical flutes 56. The example shown has two pairs of cutting edges, the primary cutting edges 58 and the secondary cutting edges 60. The rake face of the primary cutting edge 58 is at least a portion of the flute 56 and the flank surface forms at least a portion of the relief surface 62. The secondary cutting edges 60 are similarly formed at the intersection of the gash 64 and the relief surface 62 acting as rake and flank surfaces respectively. The feature identified by 66 is the margin of the drill bit whose surface is cylindrical and defines the diameter of the drill. Its function, if needed, is to guide the drill bit along its axis either by sliding along the interior of a guide bushing or the interior wall of the hole being produced. The area behind the margin, the body clearance 68 is smaller than the drill bit diameter to reduce the area of contact between the drill bit and the hole wall.

In accordance with various embodiments, the rake faces and/or flank surfaces which meet at the primary and secondary cutting edges of the drill bit shown in FIG. 7 can be textured with a pattern of recesses similar to that depicted in FIG. 4. Additionally or alternatively, a pattern of micro-scale recesses can also be applied on the margins of the drill bit, as will be described in more detail below with reference to FIGS. 9-11.

Reamers are used to enlarge and improve on drilled holes, generally producing more accurate hole dimensions than possible with a drill alone. Reamers typically have four or more flutes depending on their diameter. They need only cut a small portion of their diameter because they are enlarging an existing hole by typically only about 0.5 mm. Cutting edges are generally 45° chamfers on the outer corners of the cutter, formed at the intersection of the flute surface and a relief surface. Like drills, reamers are not designed for side cutting and have cylindrical margins on their diameter, which margins can be micro-textured as described above.

Many larger cutting tools have replaceable cutting edges in the form of inserts. FIG. 8 shows a cutting tool 70 with one insert 72. The cutting tool may be provided with multiple inserts, each insert having a respective cutting edge. Frequently each insert has multiple cutting edges so that they only need be indexed to a sharp edge to refurbish the cutting tool. The principle of cutting edges being formed at the intersection of a rake and flank surface applies to inserts as well. In accordance with various embodiments, the rake face and/or flank surface which meet at a cutting edge of an insert (such as insert 72 shown in FIG. 8) can be textured with a pattern of recesses similar to that depicted in FIG. 4.

Failure of cutting tools is particularly troublesome for materials that require high machining forces, for example, titanium, high-strength steel and other hard and super alloys. Moreover, titanium is notorious for adhesion; cutting chips are often found near the tip of the drill bit. Eventually, the built-up material leads to wearing of the drill bit. Failure occurs when drilling forces reach a sufficiently high level.

In accordance with embodiments which were subjected to testing, micro-scale surface textures were strategically applied on drill bits to reduce adhesion of titanium chips and thereby enhance tool life. Micro-scale surface textures were applied using laser ablation. Laser ablation is a versatile method for surface texturing due to its geometry possibilities and nearly limitless material choice. This technique utilizes high-intensity short and ultra-short laser pulses (nanosecond, picosecond, or femtosecond) to incrementally ablate the substrate material to create the desired feature geometry. Much work has been done to improve the capabilities of laser surface texturing. A suitable laser micro-machining system comprises a picosecond laser with 1064 nm and 532 nm wavelengths and variable repetition rates from 10 to 500 kHz. A positioning system with five degrees of freedom can be used to move the drill bit in relation to the laser beam. One known positioning system has a linear accuracy of 10 nm and a rotational accuracy of $10^{-4}$ degrees. Preferably the positioning stage movement is G-code programmable. Position-synchronized output allowed external triggering of the laser beam in coordination with the stage movement. A high-precision fixture was used to rigidly mount the drill bits in an orientation perpendicular to the laser beam direction.

Figure 9:
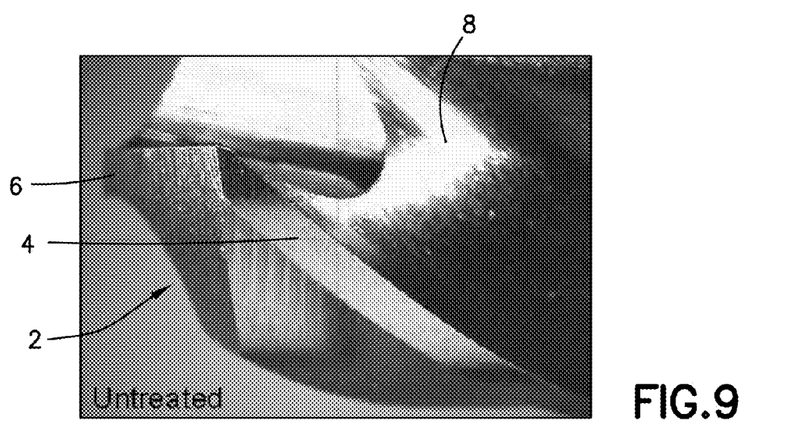
FIG. 9 is a photograph showing a portion of the tip of an untreated drill bit.

FIG. 9 shows a cutting end of an untreated drill bit 2 of the type having surfaces on which micro-scale textures can be applied. Candidate surfaces for texturing the drill bit 2 include the margins 4, lip or cutting edge reliefs 6 and flutes 8. During drilling using the drill bit seen in FIG. 9, frictional heating can occur on the drill margins 4 due to contact with the hole wall (not shown). Heat accumulation can cause chips from the workpiece to adhere to this area. Thus surface texturing on the drill bit margins has the potential to reduce heat and adhesion, thereby improving tool life. Alternatively or additionally, the flutes or cutting edge reliefs (i.e., the rake faces and flank surfaces) of a drill bit can be similarly microscaled textured.

Figure 10:
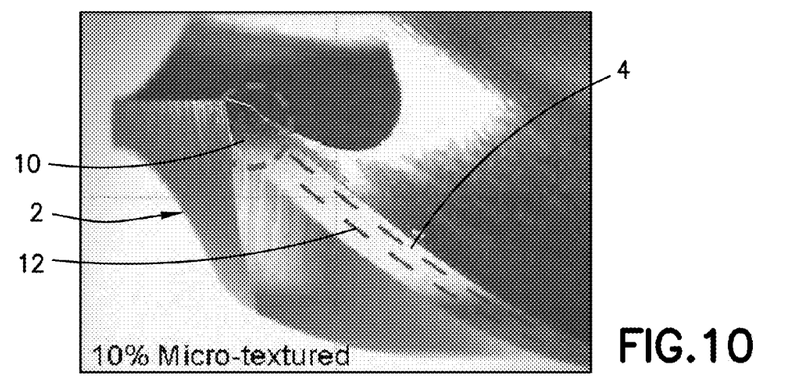
FIGS. 10 and 11 are photographs showing drill bits on which 10% and 20% respectively of the surface area was micro-textured. Note that the tip of the margin, shown in the dashed circle, was not textured.
Figure 11:
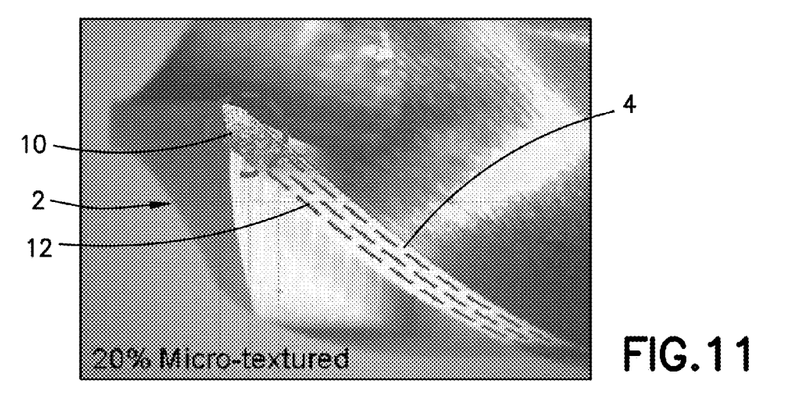

To study the effect on tool life when the margins of a drill bit are micro-textured, drilling tests were conducted using untreated drill bits, as shown in FIG. 9, and drill bits having micro-textured margins, as shown in FIGS. 10 and 11. During testing, holes were drilled in titanium alloy workpieces and the durability of the respective drill bits was monitored.

FIG. 10 shows a portion of a drill bit 2 in which a portion of the surface area of the margins 4 (only one of which is visible in FIG. 10) was micro-textured. The tip 10 (indicated by the dashed circle in FIG. 10) of the margin 4 was not textured. The margin surface area adjacent to the untextured tip 10 has two rows of micro-scale channel-type recesses 12. The recesses 12 are distributed in a triangular pattern and the rows extend along paths that run parallel or nearly parallel to the edges of the margin 4.

FIG. 11 also shows a portion of a drill bit 2 in which a portion of the surface area of the margins 4 was micro-textured. Again the tip 10 of the margin 4 was not textured. In the embodiment shown in FIG. 11, the margin surface area adjacent to the untextured tip 10 has three rows of channel-type recesses 12. Again the recesses 12 are distributed in a triangular pattern and the rows extend along paths that run parallel or nearly parallel to the edges of the margin 4.

The margins of the treated drill bits shown in FIGS. 10 and 11 were micro-textured by micro-machining a respective array of recesses into the surface of each margin, but not extending to the tip. After texturing, the samples were cleaned by sliding a cloth along the textured margins.

Figure 12:
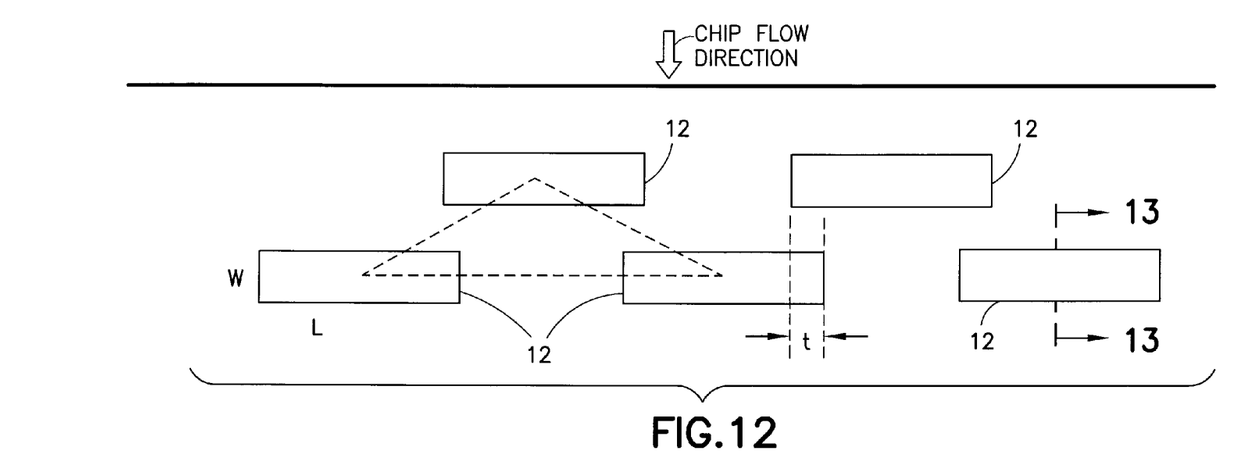
FIG. 12 is a diagram showing a graphical representation of rectangular recesses arranged in a triangular distribution pattern in accordance with one embodiment.

The surface texture geometry adopted for purposes of the experiment was an array (i.e., two rows in FIG. 10 and three rows in FIG. 11) of channel-type recesses arranged in a triangular pattern. FIG. 12 is a graphical representation of this texture geometry. It should be understood that the rectangles representing micro-machined recesses 12 in FIG. 12 are ideal shapes to illustrate common aspects of the different texture geometries which can be used to enhance tool life. FIG. 12 is not a depiction of actual recesses formed by laser ablation, the corners of which may not be precisely rectilinear when viewed under a microscope.

FIG. 12 shows two rows of mutually offset and partly overlapping channel-type recesses 12 arranged in a triangular geometric pattern. A representative triangular pattern is indicated by the dashed triangle in FIG. 12. Each recess 12 comprises an opening having a length greater than its width. The graphically represented recesses 12 have the same shape and same dimensions, but in practice, recesses 12 would be neither identical nor precisely rectangular. In accordance with various embodiments, the recess length L may be in a range of 10 to 500 microns and the width may be in a range of 5 to 200 microns. As shown in FIG. 12, the longer side of each recess is oriented transverse to a chip flow direction (indicated by the wide arrow pointing downward). The overlap t is less than one-quarter of the length of the recesses, i.e., $L/4 > t > 0$.

Figure 13:
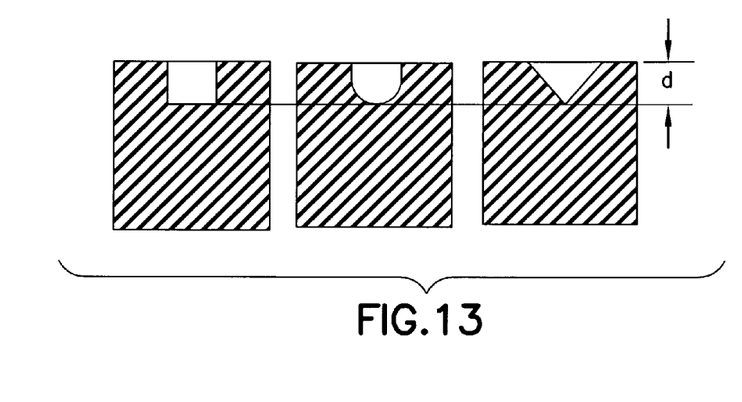
FIG. 13 is a diagram showing three alternative sectional views of any one of the recesses depicted in FIG. 12, each view showing an alternative profile (i.e., rectangular, round, triangular) for that recess. The section shown in FIG. 13 is taken along line 13-13 indicated in FIG. 12.

FIG. 13 is a diagram showing three alternative sectional views of one of the recesses 12 depicted in FIG. 12. Each view in FIG. 13 shows an alternative recess profile (i.e., rectangular, round, triangular). However, a person skilled in the art of laser machining will readily appreciate that the profiles of the laser-machined recesses, in practice, will only approximate the ideal geometric shapes depicted in FIG. 13. In accordance with various embodiments, the recess depth d of the recesses may be in a range of 1 to 10 microns.

Using the laser micro-machining system described above, high-strength steel drill bits (e.g., Dormer A920, 7.9 mm diameter by 40.6 mm flute, 76.2 mm overall length) were textured as depicted in FIGS. 10 and 11 to form channel-type recesses. The laser micro-machining system was programmed to produce two or three rows of channel-type recesses 50 microns wide, 450 microns long and 4 microns deep, arranged in a triangular pattern. The textures are so designed that they are deep and large enough to store lubricant but shallow and small enough not to induce cutting strength reduction.

There should be no chip flow across a drill margin; all drill chips should remain within the drill flutes until they are ejected from the hole. Work material pick-up and adherence to the drill margin is caused by sliding friction between the rotating drill and the hole wall. The relative motion of the hole wall across the drill margin does pass over the texture, but not at 90° to the array of rectangular depressions.

The above-described surface texture geometry was used with two different coverage areas: approximately 10% and 20% of the surface area of the drill bit margins was textured for the two designs (two and three rows of recesses, respectively shown in FIGS. 10 and 11). FIG. 10 shows a portion of a drill bit 2 in which 10% of the surface area of the margins 4 (only one of which is visible in FIG. 10) was micro-textured. The tip of the margin, indicated by the dashed circle 10, was not textured. The margin surface area adjacent to the untextured tip 10 has two rows of channel-type recesses 12 having the dimensions previously described. FIG. 11 shows a portion of a drill bit 2 in which 20% of the surface area of the margins 4 was micro-textured. Again the tip 10 of the margin 4 was not textured. In the embodiment shown in FIG. 11, the margin surface area adjacent to the untextured tip 10 has three rows of channel-type recesses 12 having dimensions as previously described.

Figure 14:
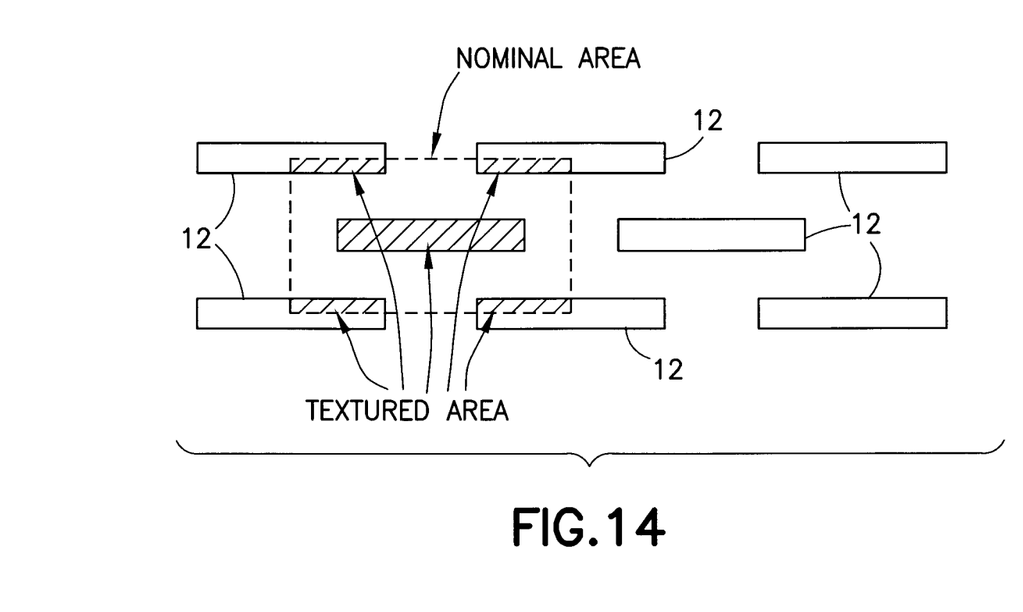
FIG. 14 is a diagram showing the geometric basis for computing the micro-scale texture coverage density from the ratio of the total textured area within a nominal area to the nominal area.

FIG. 14 shows the geometric basis for computing the micro-scale texture coverage density from the ratio of the total textured area (indicated by hatched areas) within a nominal area to the nominal area (indicated by the dashed rectangle. As previously stated, the coverage density was 10% for the drill bit depicted in FIG. 10 and 20% for the drill bit depicted in FIG. 11.

Three drill bit groups were tested, non-textured drill bits, and those with 10% and 20% of the drill margin surface textured. Although thrust, torque, and temperature values were not reduced by the introduction of textures on the drill bit, it was found that a sharp increase in peak temperature and torque while drilling were indicative of drill failure. A larger area of workpiece adhesion on the drill bit is directly linked to tool failure. Textured drill bits were found to exhibit less adhesion and improved shedding of adhered chips from hole to hole. Shedding ultimately led to a reduction in chip adhesion and therefore, extended tool life. While 100% of non-textured drill bits failed at or before 60 holes were drilled, both of the texture designs tested (with 10% and 20% of the drill margin surface area textured) only resulted in a 33% failure when drilling 60 holes. There was no discernible difference between the two texture designs in terms of drill life at the tested conditions.

It should be pointed out that the textures were not made in the tip margin region 10 (see FIGS. 2 and 3), leaving some chance for chip buildup to start there. The drill life could be further improved if the tip margin were similarly processed. In addition, a more thorough cleaning of the textured surface before drilling might remove adhered ablation debris in the recesses that would otherwise limit the effectiveness of the applied textures. Nevertheless, the experimental results revealed that creating textures on the margins of drill bits is a promising method for reducing chip adhesion and enhancing tool life. In particular, rectangular texture features with a triangular distribution pattern are promising texture designs.

Figure 15:
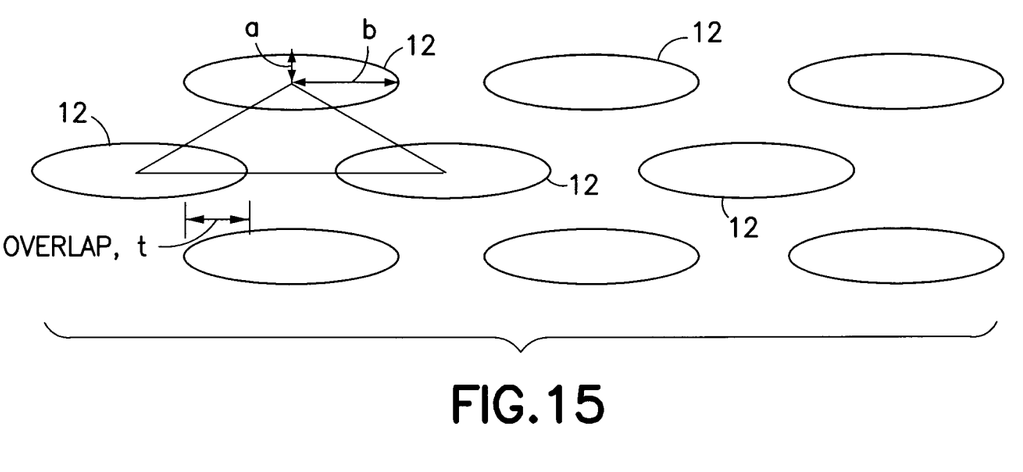
FIG. 15 is a diagram showing a graphical representation of elliptical recesses arranged in a triangular distribution pattern in accordance with another embodiment.

FIG. 15 shows three rows of mutually offset and partly overlapping elliptical recesses 12 arranged in a triangular geometric pattern. A representative triangular pattern is indicated by the triangle in FIG. 15. Each recess 12 comprises an elliptical opening having a length b of its semi-major axis greater than the length a of its semi-minor axis. The graphically represented recesses 12 have the same shape and same dimensions, but in practice, these recesses would be neither identical nor precisely rectangular. In accordance with various embodiments, the length $2b$ of the major axis may be in a range of 10 to 500 microns and the length $2a$ of the minor axis may be in a range of 5 to 200 microns. The major axis of each recess is preferably oriented transverse to a chip flow direction. The overlap t is less than one-quarter of the length $2b$ of the major axis, i.e., $b/2 > t > 0$.

The application of engineered micro-textures to various surfaces of cutting tools takes advantage of the adhesion reduction benefit that the micro-textures provide. Reduction of friction is one such benefit of certain micro-textures as seen in the study of tribology. In cases where a surface near a cutting edge is textured, the designed textures allow the cutting chips to move out along the cutter surface path and over the alternating physical conditions of texture banks and indents. During this movement, the surfaces of the chip can be immediately wetted with oil or cooled by air in the indents following each brief period of solid contact with the texture bank, thereby avoiding adhesion. Therefore, the designed triangular pattern of recess distribution disclosed hereinafter is beneficial because the contact between the chips and the cutter surface is completely interrupted. Micro-textures provide mini-reservoirs to keep coolants and lubricants in the cutting zone to improve cutting efficiency. As a result of adhesion reduction, contact interruption, and alternating wetting or cooling, such a micro-texture applied to the rake face of a cutting tool in an area adjacent to the cutting edge has the benefit of reducing heat at the cutting tool and chip interface and reducing machine tool power requirements. Easier chip escape could slow the wear of cutter surfaces, thereby providing the benefit of longer-lasting cutting tools with reduced power requirements. The foregoing explains the mechanisms by which micro-textures applied to portions of cutting tools that experience sliding contact with either the chip or the workpiece, such as the margins of drills, have been shown to inhibit workpiece material adhesion to the cutting tool, i.e., by reducing the area of contact and interrupting the bond-line between the built-up material and the cutter, and the reason for reduced friction and heat, increased cutting tool life and power savings.

While various embodiments have been described, it will be understood by those skilled in the art that various changes may be made and equivalents may be substituted for elements thereof without departing from the scope of the teachings herein. In addition, many modifications may be made to adapt a particular situation to those teachings without departing from the essential scope thereof. Therefore it is intended that scope of the claims set forth hereinafter not be limited to the disclosed embodiments.

The invention claimed is:

1. A cutting tool comprising first and second surfaces that intersect at an edge, wherein said first surface has a textured region comprising a multiplicity of recesses each having a length greater than its width, said recesses being distributed in a pattern comprising a first row of recesses arranged lengthwise along a first line with spaces between neighboring recesses of said first row, and a second row of recesses arranged lengthwise along a second line with spaces between neighboring recesses of said second row, said recesses of said first row being offset from said recesses of said second row, wherein at least one recess of said first row has one end portion that overlaps with an end portion of one recess in said second row and another end portion that overlaps with an end portion of another recess in said second row, wherein said recesses of said first row are generally parallel to and equidistant from said edge.

2. The cutting tool as recited in claim 1, wherein said edge is a cutting edge and said first surface is a rake face.

3. The cutting tool as recited in claim 1, wherein said edge is a cutting edge and said first surface is a flank surface.

4. The cutting tool as recited in claim 1, wherein said first surface is a margin of a drill bit or reamer and said edge is helical.

5. The cutting tool as recited in claim 1, wherein said recesses have depths in a range of 1 to 10 microns.

6. The cutting tool as recited in claim 1, wherein said recesses each have a length in a range of 10 to 500 microns and a width in a range of 5 to 200 microns.

7. The cutting tool as recited in claim 1, wherein the overlap of said end portions is less than one-quarter of a length of said at least one recess in said first row.

8. A method for treating a cutting tool to improve its durability, comprising machining a multiplicity of recesses in a surface adjacent to an edge of the cutting tool, each of said recesses of said multiplicity having a length greater than its width, said recesses being distributed in a pattern comprising a first row of recesses arranged lengthwise along a first line with spaces between neighboring recesses of said first row, and a second row of recesses arranged lengthwise along a second line with spaces between neighboring recesses of said second row, said recesses of said first row being offset from said recesses of said second row, wherein at least one recess of said first row has one end portion that overlaps with an end portion of one recess in said second row and another end portion that overlaps with an end portion of another recess in said second row, wherein said recesses of said first row are generally parallel to and equidistant from said edge.

9. The method as recited in claim 8, wherein said edge is a cutting edge and said first surface is a rake face.

10. The method as recited in claim 8, wherein said edge is a cutting edge and said first surface is a flank surface.

11. The method as recited in claim 8, wherein said first surface is a margin of a drill bit or reamer and said edge is helical.

12. The method as recited in claim 8, wherein said recesses have depths in a range of 1 to 10 microns.

13. The method as recited in claim 8, wherein said recesses each have a length in a range of 10 to 500 microns and a width in a range of 5 to 200 microns.

14. The method as recited in claim 8, wherein the overlap of said end portions is less than one-quarter of a length of said at least one recess in said first row.

15. A cutting tool comprising a rake face and a flank surface which intersect at a cutting edge, wherein said flank surface has a textured region near said cutting edge, said textured region comprising a multiplicity of machined recesses distributed in a pattern, wherein each of said recesses has a length greater than its width, said multiplicity comprising a first row of recesses arranged lengthwise along a first line with spaces between neighboring recesses of said first row, and a second row of recesses arranged lengthwise along a second line with spaces between neighboring recesses of said second row, said recesses of said first row being offset from said recesses of said second row, wherein at least one recess of said first row has one end portion that overlaps with an end portion of one recess in said second row and another end portion that overlaps with an end portion of another recess in said second row, and wherein said recesses of said first row are generally parallel to and equidistant from said cutting edge.

16. A cutting tool comprising a margin and a flute which intersect at a helical edge, wherein said margin has a textured region comprising a multiplicity of machined recesses distributed in a pattern.

17. The cutting tool as recited in claim 16, wherein each of said recesses has a length greater than its width, said multiplicity comprising a first row of recesses arranged lengthwise along a first curved line with spaces between neighboring recesses of said first row, and a second row of recesses arranged lengthwise along a second curved line with spaces between neighboring recesses of said second row, said recesses of said first row being offset from said recesses of said second row, wherein at least one recess of said first row has one end portion that overlaps with an end portion of one recess in said second row and another end portion that overlaps with an end portion of another recess in said second row.

\* \* \* \* \*